(12) United States Patent
Ishikawa et al.

(10) Patent No.: US 11,946,916 B2
(45) Date of Patent: Apr. 2, 2024

(54) WAVEFORM PROCESSING ASSISTANCE DEVICE AND WAVEFORM PROCESSING ASSISTANCE METHOD

(71) Applicant: SHIMADZU CORPORATION, Kyoto (JP)

(72) Inventors: Yuki Ishikawa, Kyoto (JP); Hiroaki Kozawa, Kyoto (JP); Takeshi Yoshida, Kyoto (JP); Yuji Katsuyama, Kyoto (JP); Toshinobu Yanagisawa, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 0 days.

(21) Appl. No.: 17/548,547

(22) Filed: Dec. 12, 2021

(65) Prior Publication Data
US 2022/0198177 A1 Jun. 23, 2022

(30) Foreign Application Priority Data
Dec. 21, 2020 (JP) ................................. 2020-211336

(51) Int. Cl.
*G01N 21/3577* (2014.01)
*G01N 21/3581* (2014.01)
(Continued)

(52) U.S. Cl.
CPC ..... *G01N 30/8624* (2013.01); *G06F 2218/10* (2023.01)

(58) Field of Classification Search
CPC .......... G01N 30/8624; G01N 30/8675; G01N 30/72; G01N 30/8696; G06K 9/0053; G06F 2218/10
(Continued)

(56) References Cited

U.S. PATENT DOCUMENTS 5,375,067 A * 12/1994 Berchin ............... G01R 13/345
700/74
11,209,406 B2 * 12/2021 Yanagisawa ........... G01N 30/72
(Continued)

FOREIGN PATENT DOCUMENTS

CN 110376280 A * 10/2019 ............. G01N 29/04
JP 2008-058156 A 3/2008
(Continued)

*Primary Examiner* — Jeffrey P Aiello
(74) *Attorney, Agent, or Firm* — Renner, Otto, Boisselle & Sklar, LLP

(57) ABSTRACT

A waveform processing assistance device includes an acquirer that acquires a plurality of waveform data obtained by an analysis of a sample, a selector that selects reference data among the waveform data, an extractor that extracts correct answer peaks and correct answer data from the reference data a determiner that determines each processing section including a correct answer peak and each parameter initial value, a waveform processor that performs waveform processing in each determined processing section based on each parameter initial value, an adjuster that generates a parameter adjustment value at which a waveform processing result obtained in each processing section matches or approximates corresponding correct answer data, and a program creator that creates a waveform processing execution program that includes an instruction to execute waveform processing using the parameter adjustment value in each processing section.

9 Claims, 11 Drawing Sheets

(51) Int. Cl.
*G01N 30/86* (2006.01)
*G01N 33/00* (2006.01)
*G01R 23/16* (2006.01)

(58) Field of Classification Search
USPC .............. 324/76.12, 379, 602; 702/1, 66–67, 702/70–73, 79–79, 124–127, 189
See application file for complete search history.

(56) References Cited

U.S. PATENT DOCUMENTS

| | | | |
|---|---|---|---|
| 2008/0059079 A1* | 3/2008 | Watabe | G01N 30/8675 702/23 |
| 2008/0215297 A1* | 9/2008 | Goebel | G01N 15/1459 356/73 |
| 2010/0082263 A1 | 4/2010 | Watabe | |
| 2012/0310546 A1* | 12/2012 | Watabe | G01N 30/8675 702/23 |
| 2015/0081250 A1 | 3/2015 | Nakayama | |
| 2016/0139041 A1* | 5/2016 | Gulati | A61B 5/02416 702/21 |
| 2016/0231297 A1* | 8/2016 | Noda | G01N 30/8644 |
| 2017/0336370 A1* | 11/2017 | Noda | G01N 30/86 |
| 2020/0279408 A1* | 9/2020 | Osoekawa | G06T 7/12 |

FOREIGN PATENT DOCUMENTS

| | | | | |
|---|---|---|---|---|
| JP | 2015-059782 A | 3/2015 | | |
| WO | WO-2017046988 A1 * | 3/2017 | ............. | G01N 15/14 |

* cited by examiner

FIG. 10

| TIME PROGRAM (AFTER ADJUSTMENT) | | | |
|---|---|---|---|
| PROCESSING SECTION | Slope | Width | Drift |
| 01M'~12M' | 1S' | 1W' | 1D' |
| 12M'~23M' | 2S' | 2W' | 2D' |
| 23M'~34M' | 3S' | 3W' | 3D' |
| 34M'~45M' | 4S' | 4W' | 4D' |
| 45M'~56M' | 5S' | 5W' | 5D' |
| 56M'~60M' | 6S' | 6W' | 6D' |

F I G. 1 1
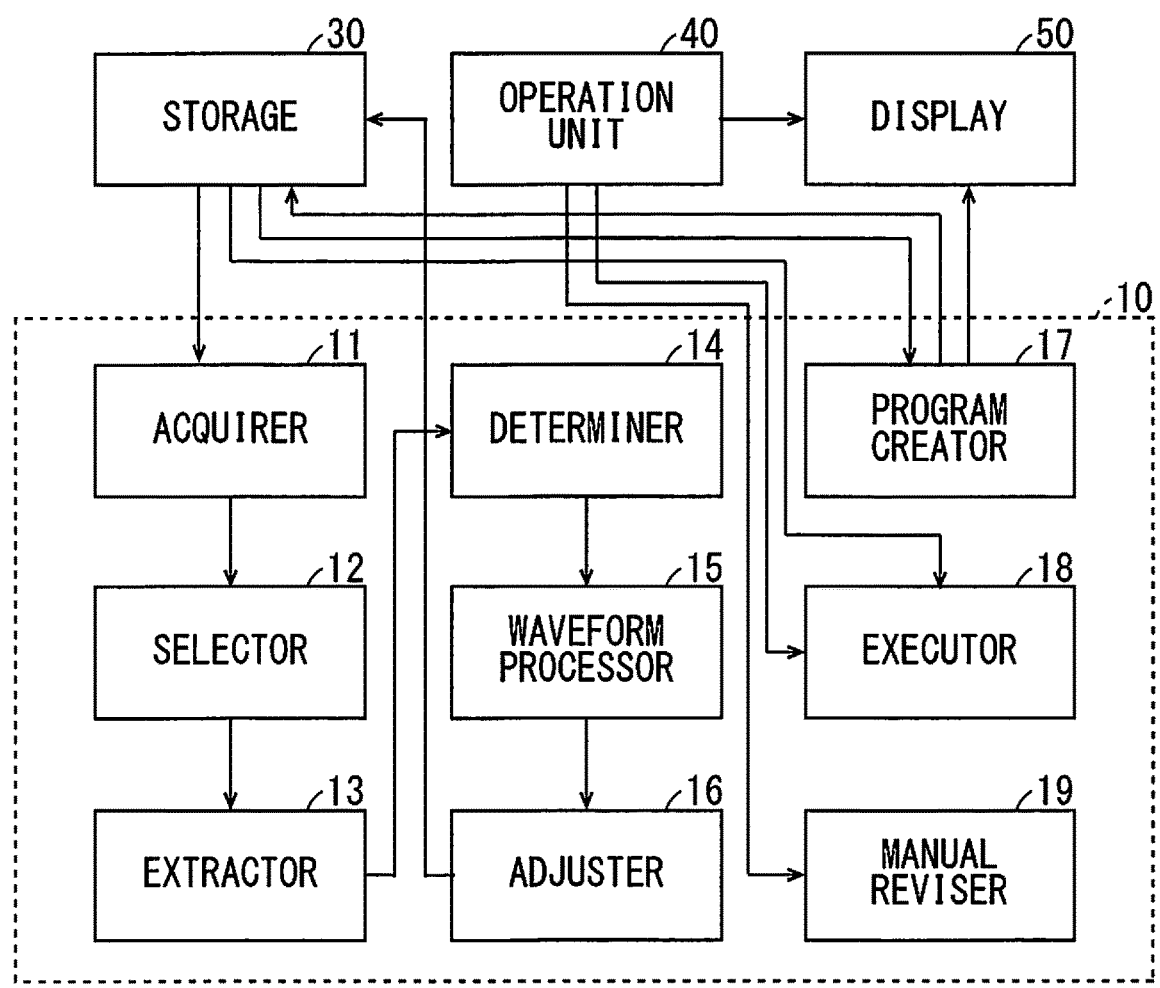

WAVEFORM PROCESSING ASSISTANCE DEVICE AND WAVEFORM PROCESSING ASSISTANCE METHOD

BACKGROUND

Technical Field

The present invention relates to a waveform processing assistance device and a waveform processing assistance method.

Description of Related Art

Waveform processing is performed to separate each of peaks from waveform data obtained as analysis results by various analyzers. For example, a chromatogram is obtained as waveform data in a chromatographic device. Also, a mass spectrum is obtained as waveform data in a mass spectrometer. Values of waveform processing parameters are set in order to separate each peak from the waveform data. As waveform processing parameters, a minimum full width at half-maximum (Width) and an inclination of a baseline (Slope) are used (See JP 2015-059782 A, for example). As waveform processing results, sections of peaks, intensities of the peaks, areas of the peaks, etc. are obtained. The values of the waveform processing parameters are set in order to separate each peak from the waveform data. A user sets the value of at least one type waveform processing parameter to separate each peak from the waveform data.

When waveform processing is performed on the entire waveform data using the same values of waveform processing parameters, some of the peaks cannot be separated depending on the shape, the size, etc. of each peak in some cases.

JP 2008-058156 A describes a waveform processing timetable. A user can designate different baseline drawing methods for waveform processing in a plurality of processing sections of the waveform processing timetable.

SUMMARY

However, a high level of skill is required to determine values of appropriate waveform processing parameters in each of a plurality of processing sections of the waveform processing timetable. Also, trials and errors are necessary since the values of waveform processing parameters have a high degree of flexibility. Furthermore, an elution time or an intensity of each peak is deviated in some cases due to deterioration of a separation column of an analyzer or accuracy of the analyzer. It is necessary to perform the waveform processing on a plurality of waveform data in order to determine the values of robust waveform processing parameters with respect to time and intensity. Thus, it takes time and effort to determine the values of waveform processing parameters in each processing section.

An object of the present invention is to provide a waveform processing assistance device and a waveform processing assistance method that enable waveform processing to be appropriately and easily performed on one or a plurality of waveform data.

A waveform processing assistance device that assists waveform processing of separating peaks of waveform data indicating an analysis result of an analyzer based on a value of a waveform processing parameter according to one aspect includes: an acquirer that acquires a plurality of waveform data obtained by an analysis of a sample; a selector that selects at least one of the acquired plurality of waveform data as reference data; an extractor that extracts a plurality of peaks separated from the reference data as a plurality of correct answer peaks and also extracts a waveform processing result with respect to each of the plurality of correct answer peaks as correct answer data; a determiner that determines a plurality of processing sections that respectively include the plurality of correct answer peaks, and also determines a value of a waveform processing parameter for obtaining the plurality of correct answer data as a parameter initial value; a waveform processor that performs waveform processing on the acquired plurality of waveform data in each of the determined plurality of processing sections based on the parameter initial value; an adjuster that adjusts the parameter initial value corresponding to each of the plurality of processing sections such that the waveform processing result obtained in each processing section matches or approximates corresponding correct answer data of the plurality of correct answer data, to generate a parameter adjustment value; and a program creator that creates a waveform processing execution program that includes an instruction to execute waveform processing using the corresponding parameter adjustment value in each of the plurality of processing sections.

A waveform processing assistance method of assisting waveform processing of separating peaks of waveform data indicating an analysis result of an analyzer based on a value of a waveform processing parameter includes:

acquiring a plurality of waveform data obtained by an analysis of a sample; selecting at least one of the acquired plurality of waveform data as reference data;

extracting a plurality of peaks separated from the reference data as a plurality of correct answer peaks and also extracting a waveform processing result with respect to each of the plurality of correct answer peaks as correct answer data; determining a plurality of processing sections that respectively include the plurality of correct answer peaks, and also determining a value of a waveform processing parameter for obtaining the plurality of correct answer data as a parameter initial value; performing waveform processing on the acquired plurality of waveform data in each of the determined plurality of processing sections based on the parameter initial value; adjusting the parameter initial value corresponding to each of the plurality of processing sections such that the waveform processing result obtained in each of the processing sections matches or approximates corresponding correct answer data of the plurality of correct answer data, to generate a parameter adjustment value; and creating a waveform processing execution program that includes an instruction to execute waveform processing using the corresponding parameter adjustment value in each of the plurality of processing sections.

Other features, elements, characteristics, and advantages of the present disclosure will become more apparent from the following description of preferred embodiments of the present disclosure with reference to the attached drawings.

BRIEF DESCRIPTION OF THE DRAWING

FIG. 10 is a schematic diagram for explaining the automatic creation operation of the time program by the waveform processing assistance device;

FIG. 11 is a block diagram showing a functional configuration of the waveform processing assistance device;

DETAILED DESCRIPTION

A waveform processing assistance device and a waveform processing assistance method according to embodiments of the present invention will be described below in detail with reference to the drawings.

(1) Configuration of Analysis System

Figure 1:
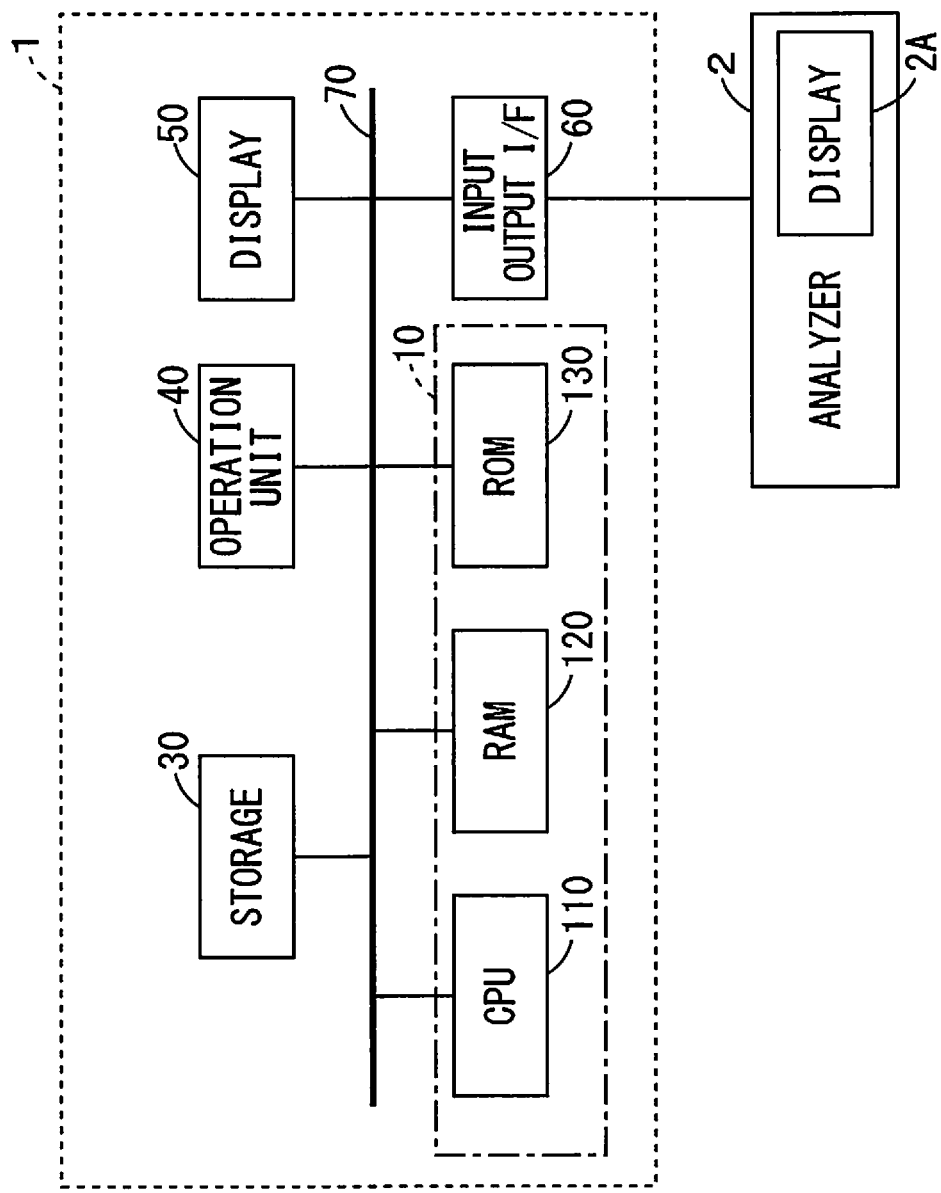
FIG. 1 is a block diagram showing a configuration of an analysis system including a waveform processing assistance device according to one embodiment of the present invention.

FIG. 1 is a block diagram showing a configuration of an analysis system including a waveform processing assistance device according to one embodiment of the present invention. As shown in FIG. 1, the analysis system 100 includes a controller 1 and an analyzer 2.

The controller 11 is constituted by a CPU (central processing unit) 110, a RAM (random access memory) 120, a ROM (read only memory) 130, a storage 30, an operation unit 40, a display 50, and an input output I/F (interface) 60. The CPU 110, the RAM 120, the ROM 130, the storage 30, the operation unit 40, the display 50, and the input output I/F (interface) 60 are connected to a bus 70. The CPU 110, the RAM 120, and the ROM 130 constitute a waveform processing assistance device 10. Details of the waveform processing assistance device 10 will be described below.

The RAM 120 is used as a working area of the CPU 110. A system program is stored in the ROM 130. The storage 30 includes a storage medium such as a hard disk or a semiconductor memory. The storage 30 stores a waveform processing assistance program. The waveform processing assistance program is a computer program for the waveform processing assistance device 10 to perform a waveform processing assistance operation. The waveform processing assistance program may be stored in the ROM 130 or an external storage device.

The CPU 110 executes the waveform processing assistance program stored in the storage 30 or the like on the RAM 120, so that the waveform processing assistance operation is performed. The waveform processing assistance operation will be described below.

The operation unit 40 is an input device such as a keyboard, a mouse or a touch panel and is operated by a user to provide a predetermined instruction to the waveform processing assistance device 10. The display 50 is a display device such as a liquid crystal display device. The input output I/F 60 is connected to the analyzer 2.

The analyzer 2 may be a chromatograph such as a liquid chromatograph, a gas chromatograph or a supercritical fluid chromatograph, or may be a mass spectrometer, etc. In this embodiment, the analyzer 2 is a liquid chromatograph. The analyzer 2 includes a display 2A.

The analyzer 2 generates waveform data indicating an analysis result. In a case where the analyzer 2 is a chromatograph, the waveform data is a chromatogram. An abscissa of the chromatogram represents an elution time (a retention time), and an ordinate thereof represents a signal intensity. In a case where the analyzer 2 is a mass spectrometer, the waveform data is a mass spectrum. An abscissa of the mass spectrum represents a mass-to-charge ratio (m/z), and an ordinate thereof represents a signal intensity. The abscissa of the waveform data is referred to as position. The ordinate of the waveform data is referred to as intensity. In this embodiment, the waveform data is a chromatogram.

(2) Waveform Processing Parameter and Waveform Processing Result

Waveform processing is performed on waveform data in order to separate peaks based on values of one or a plurality of types of waveform processing parameters. The waveform processing parameters and the waveform processing will now be described.

FIGS. 2 to 5 are diagrams for explaining the waveform processing parameters and the waveform processing. In this embodiment, "Slope," "Width," and "Drift" are used as the waveform processing parameters. A peak separation method may be used as the waveform processing parameter. The peak separation method includes vertical division, complete separation (baseline separation), complete separation of a shoulder peak, etc.

Figure 2:
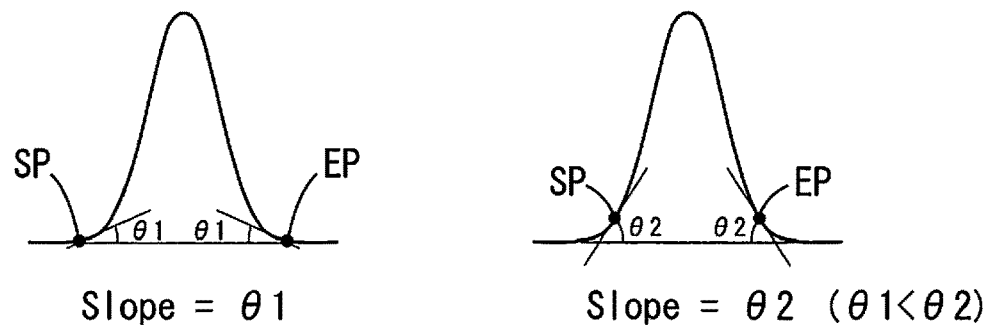
FIG. 2 is a diagram for explaining waveform parameters and waveform processing.

FIG. 2 shows a waveform processing result in a case where the values of "Slope" are different. "Slope" (unit: pV/min) is a threshold value of inclination for detecting a peak start point SP and a peak end point EP and represents detection sensitivity of a peak. The value of "Slope" is set to $\theta 1$ in an example on the left side of FIG. 2, and the value of "Slope" is set to $\theta 2$ that is larger than $\theta 1$ in an example on the right side of FIG. 2.

With the waveform processing performed based on the value of "Slope," a position where the inclination of a waveform from a left baseline toward the peak reaches the value of "Slope" is detected as the peak start point SP. A position where the inclination of the waveform from the peak toward a right baseline reaches the value of "Slope" is detected as the peak end point EP. In this way, when the value of "Slope" is different, the detected peak start point SP and peak end point EP are different.

Figure 3:
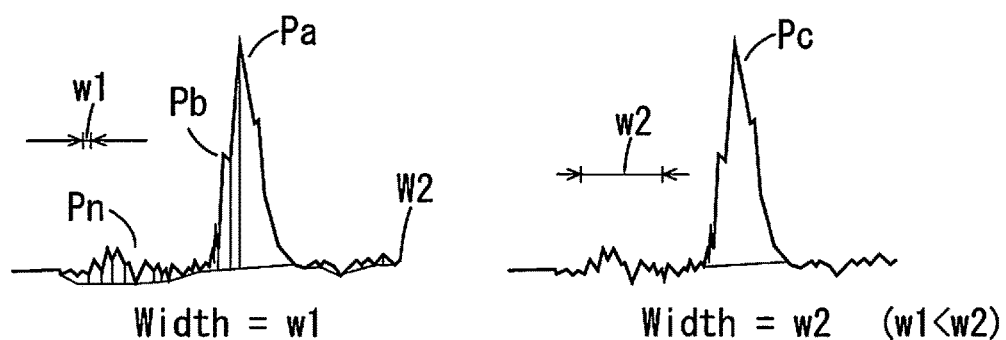
FIG. 3 is a diagram for explaining waveform parameters and waveform processing.

FIG. 3 shows a waveform processing result in a case where the value of "Width" is different. "Width" (unit: sec) is a minimum value of a half width of a peak to be detected. The value of "Width" is set to w1 in an example on the left side of FIG. 3, and the value of "Width" is set to w2 that is larger than w1 in an example on the right side of FIG. 3.

With the waveform processing performed based on the value of "Width," all of peaks of not less than the half width w1 are detected in the example on the left side of FIG. 3. For example, a peak Pa and a peak Pb are separated. On the other hand, noise is detected as a peak pn. In the right side example of FIG. 3, only a peak Pc of not less than a half width w2 is detected. For example, partially overlapped adjacent two peaks are detected as one peak. On the other hand, noise n is not detected as a peak.

In this way, in a case where the value of "Width" is set to a large value, detection of the noise as a peak can be prevented. On the other hand, in a case where the value of "Width" is too large, the partially overlapped adjacent peaks are detected as one peak in some cases.

Figure 4:
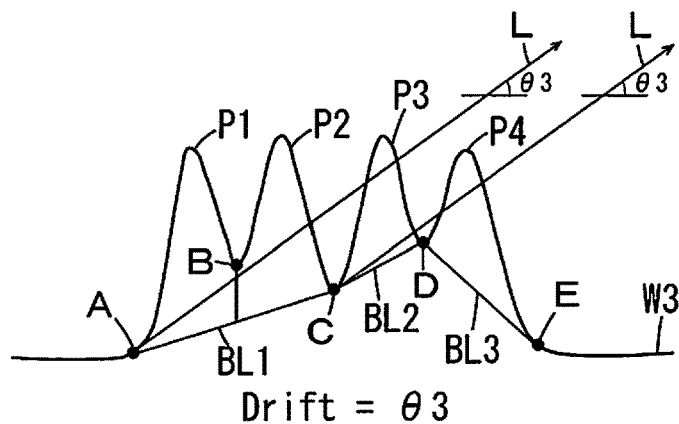
FIG. 4 is a diagram for explaining waveform parameters and waveform processing.

FIG. 4 shows differences in the peak separation methods depending on a value of "Drift." "Drift" (unit: μV/min) is a threshold value of variation of a baseline. FIG. 4 shows a plurality of peaks P1, P2, P3, and P4 and a plurality of local minimum points (valleys between the peaks) A, B, C, D, and E. In the example of FIG. 4, the value of "Drift" is set to θ3.

With the waveform processing performed based on the value of "Drift," a Drift setting line L with an inclination θ3 that passes through each local minimum point is drawn. For example, the local minimum point B is located at a position farther upward than the Drift setting line L passing through the local minimum point A. In this case, a straight line connecting the local minimum points A and B is not regarded as a baseline. In contrast, the local minimum point C is located at a position farther downward than the Drift setting line L passing through the local minimum point A. In this case, a baseline correction line BL1 connecting the local minimum points A and C is set. Thus, the peaks P1 and P2 are vertically divided at the local minimum point B. The local minimum point D is located at a position farther downward than the Drift setting line L passing through the local minimum point C. In this case, a baseline correction line BL2 connecting the local minimum points C and D is set. Thus, the peak P3 is completely separated. Similarly, the local minimum point E is located at a position farther downward than the Drift setting line (not shown) passing through the local minimum point D. In this case, a baseline correction line BL3 connecting the local minimum points D and E is set. Thus, the peak P4 is completely separated.

In a case where the value of "Drift" is set to a small value, each peak is likely to be vertically divided. On the other hand, in a case where the value of "Drift" is set to a large value, each peak is likely to be completely separated. In this way, the peak separation methods can be differentiated depending on the value of "Drift."

The peak separation method will now be described. The peak separation method (vertical division/complete separation) includes a case where the peak separation method is set as the waveform processing parameter and a case where the peak separation method is obtained as the waveform processing result depending on the value of "Drift." In this embodiment, the peak separation method includes the vertical division and the complete separation. In a left side example and a right side example of FIG. 5, partially overlapped adjacent peaks P5 and P6 are shown.

Figure 5:
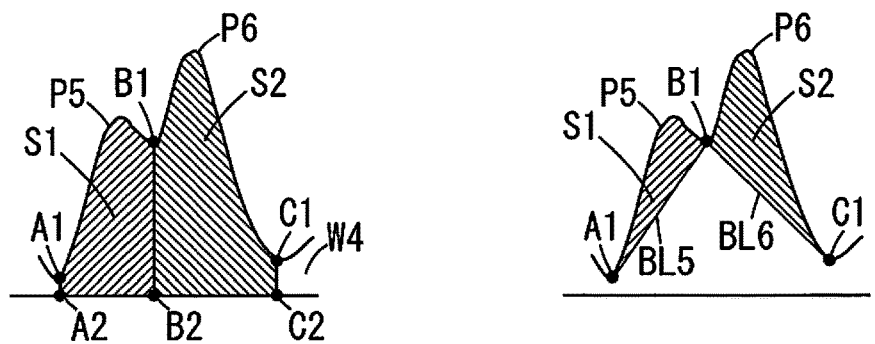
FIG. 5 is a diagram for explaining waveform parameters and waveform processing.

The left side example of FIG. 5 shows the vertical division. In the vertical division, straight lines A1-A2, B1-B2, and C1-C2 that are perpendicular to the abscissa are set from local minimum points A1, B1, C1, respectively. The peaks P5 and P6 are each separated by the straight lines A1-A2, B1-B2, and C1-C2. An area of the peak 5 is an area of a region surrounded by a curve connecting the local minimum point A1 and the local minimum point B1, the straight line A1-A2, the straight line B1-B2, and the abscissa. An area of the peak P6 is an area of a region surrounded by a curve connecting the local minimum point B1 and the local minimum point C1, the straight line B1-B2, the straight line C1-C2, and the abscissa.

The right side example of FIG. 5 shows the complete separation. In the complete separation, a baseline auxiliary line BL5 connecting the adjacent local minimum points A1 and B1 is set, and a baseline auxiliary line BL6 connecting the adjacent local minimum points B1 and C1 is set. The peaks P5 and P6 are separated by the baseline auxiliary lines BL5 and BL6, respectively. An area of the peak P5 is an area of a region surrounded by a curve connecting the local minimum point A1 and the local minimum point B1 and the baseline auxiliary line BL5. An area of the peak P6 is an area of a region surrounded by a curve connecting the local minimum point B1 and the local minimum point C1 and the baseline auxiliary line BL6.

In this way, the area of the peak separated by the vertical division is larger than that of the peak separated by the complete separation. Thus, in a case where a component corresponding to each peak is quantitatively analyzed, the peaks of the same component are desirably separated by the same separation method.

It is noted that the values of waveform processing parameters are not limited to numerals, and also include identification information that specifies whether the peak separation method is the vertical division or the complete separation. Such identification information is represented by digital values in the CPU 110.

The waveform processing results obtained by the waveform processing in this embodiment will now be described. The waveform processing results are obtained by separating each peak from waveform data based on the values of one or a plurality of types of set waveform processing parameters. The waveform processing results include a position of a peak start point, an intensity of the peak start point, a position of a peak end point, an intensity of the peak end point, a position of a peak top, an intensity of the peak top, an area of the peak, an S/N (a signal-to-noise ratio), a type of the peak separation method (vertical division/complete separation), etc.

(3) Automatic Creation Operation of Time Program

In the waveform processing results obtained by the waveform processing, peaks are not separated from waveform data in some cases. In such cases, a user determines a section that includes one or a plurality of peaks (hereinafter referred to as processing section) and also determines the values of waveform processing parameters for each processing section such that desired peaks are separated in each processing section.

A waveform processing execution program includes an instruction to execute waveform processing using the value of the waveform processing parameters set for each processing section. With the waveform processing execution program, the waveform processing is sequentially executed on the waveform data using the values of the waveform processing parameters set for each of the plurality of processing sections. In this embodiment, the waveform processing execution program is referred to as time program. The waveform processing assistance device 10 according to this embodiment has a function of automatically creating a time program. A time program automatic creation operation in the waveform processing assistance device 10 according to this embodiment will be described below.

Figure 6:
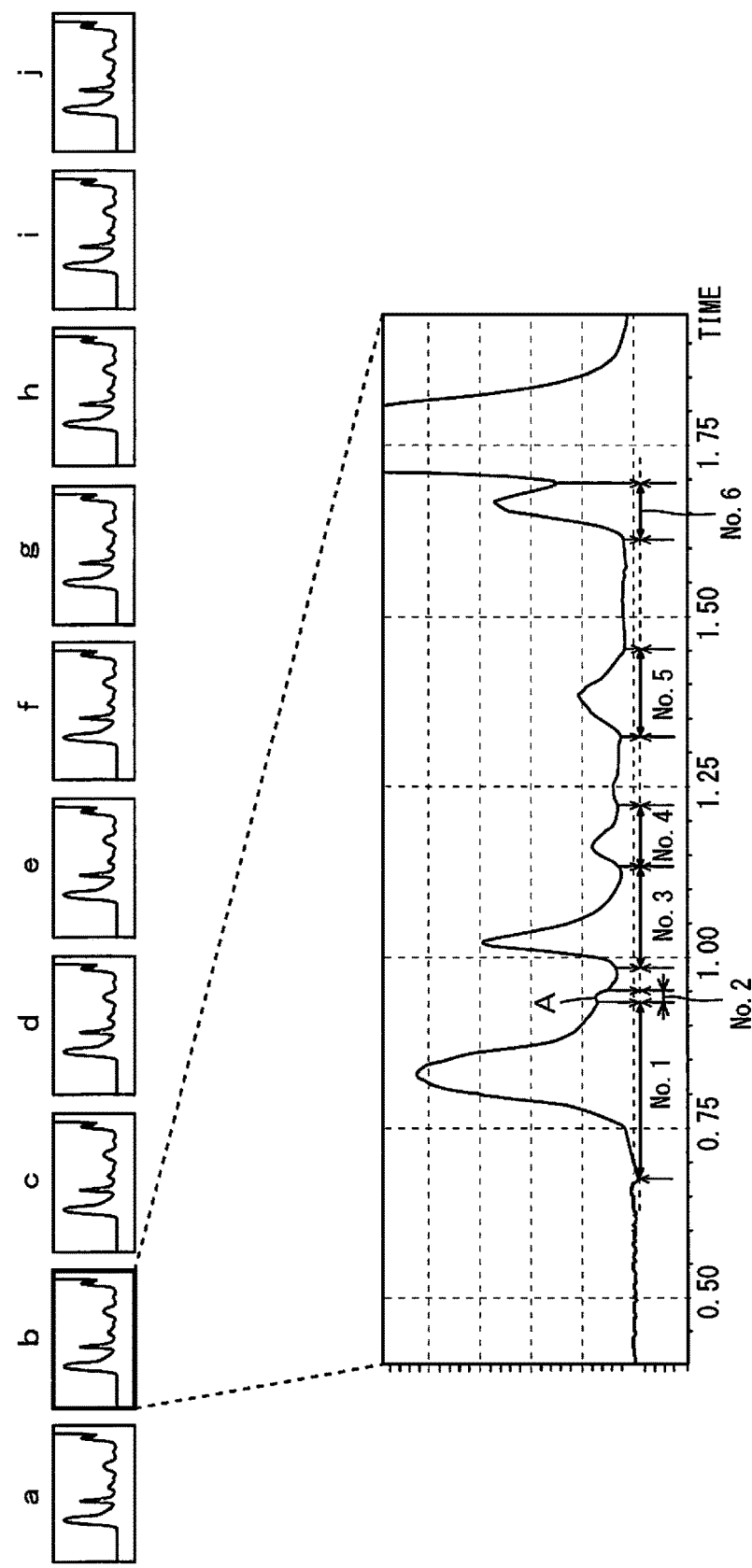
FIG. 6 is a schematic diagram for explaining an automatic creation operation of a time program by a waveform processing assistance device.

FIGS. 6 to 10 are schematic diagrams for explaining the automatic creation operation of the time program by the waveform processing assistance device 10. The storage 30 of FIG. 1 stores a plurality of waveform data a to j obtained by an analysis of the same sample as shown in FIG. 6. The abscissa of each waveform data a to j represents time, and the ordinate represents signal intensity. Also, the storage 30 of FIG. 1 stores waveform data obtained by an analysis not using a sample on the same analysis condition. The waveform data obtained by the analysis not using the sample on the same condition is hereinafter referred to as background chromatogram.

The waveform data a to j are subjected to waveform processing in advance using the value of one or a plurality of types of waveform processing parameters. Thus, the waveform data a to j have waveform processing results, respectively. That is, one or a plurality of peaks are separated from the waveform data a to j.

The waveform data a to j may be waveform data obtained on different analysis conditions with respect to the same sample. The waveform data a to j may have waveform processing results obtained by waveform processing by an existing waveform processing algorithm. The waveform data a to j may have waveform processing results obtained by an existing time program.

Also, the user can revise the waveform processing results obtained by the waveform processing using the operation unit 40 of FIG. 1. For example, the user can revise the start point and the end point of each peak separated by the waveform processing. At least one of the waveform data a to j may be waveform data that has a manually revised waveform processing result.

In the waveform processing assistance device 10, at least one of the waveform data a to j is selected. The selected waveform data is hereinafter referred to as reference data. In this example, one waveform data b is selected as the reference data. A plurality of data may be selected as the reference data.

As shown in FIG. 6, peaks No. 1 to No. 6 are separated from the waveform data b. Each peak separated from the reference data is referred to as correct answer peak, and a waveform processing result with respect to each correct answer peak is referred to as correct answer data. In this example, the peaks No. 1 to No. 6 of the waveform data b are referred to as correct answer peaks No. 1 to No. 6.

Figure 7:
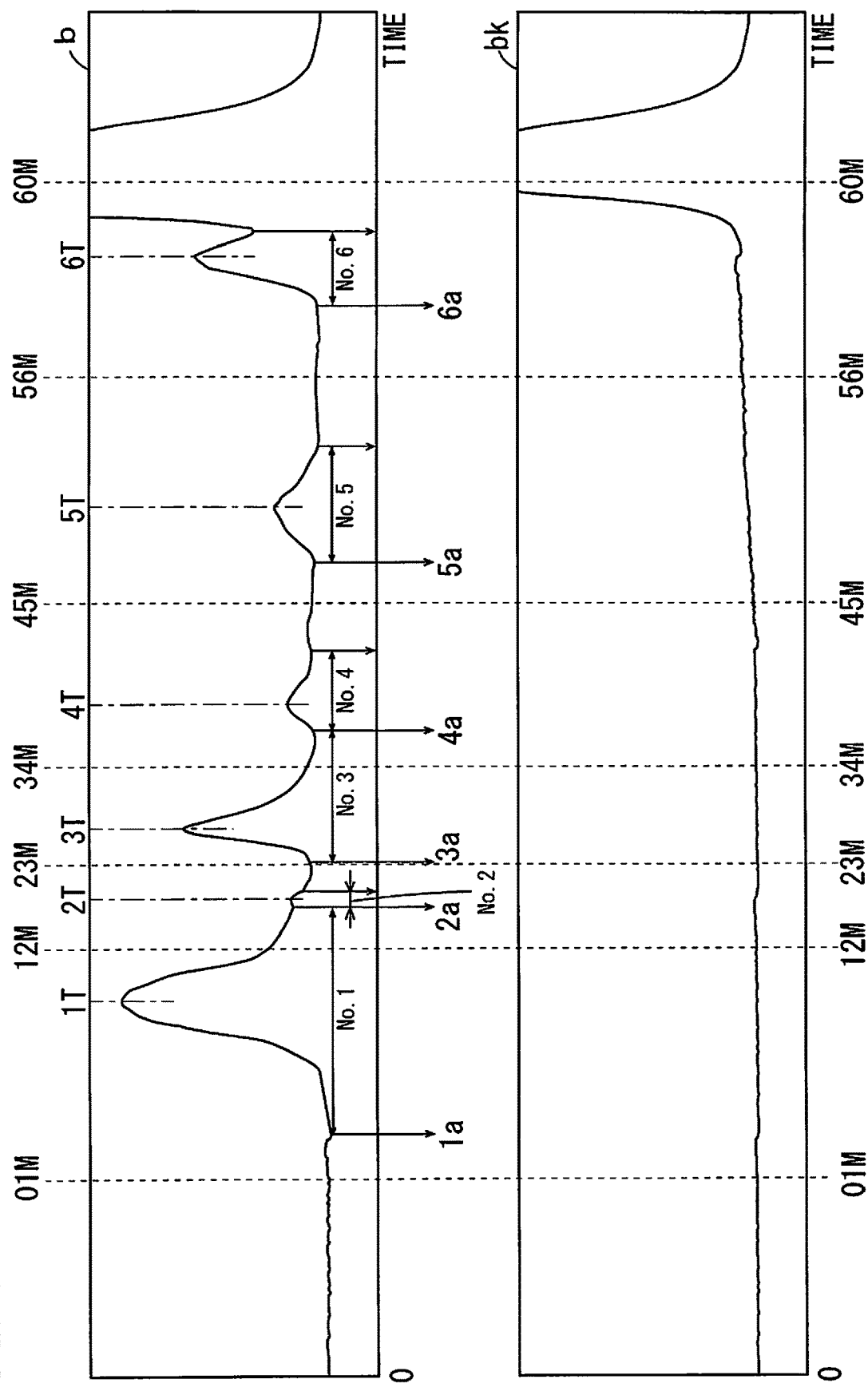
FIG. 7 is a schematic diagram for explaining the automatic creation operation of the time program by the waveform processing assistance device.
Figure 8:
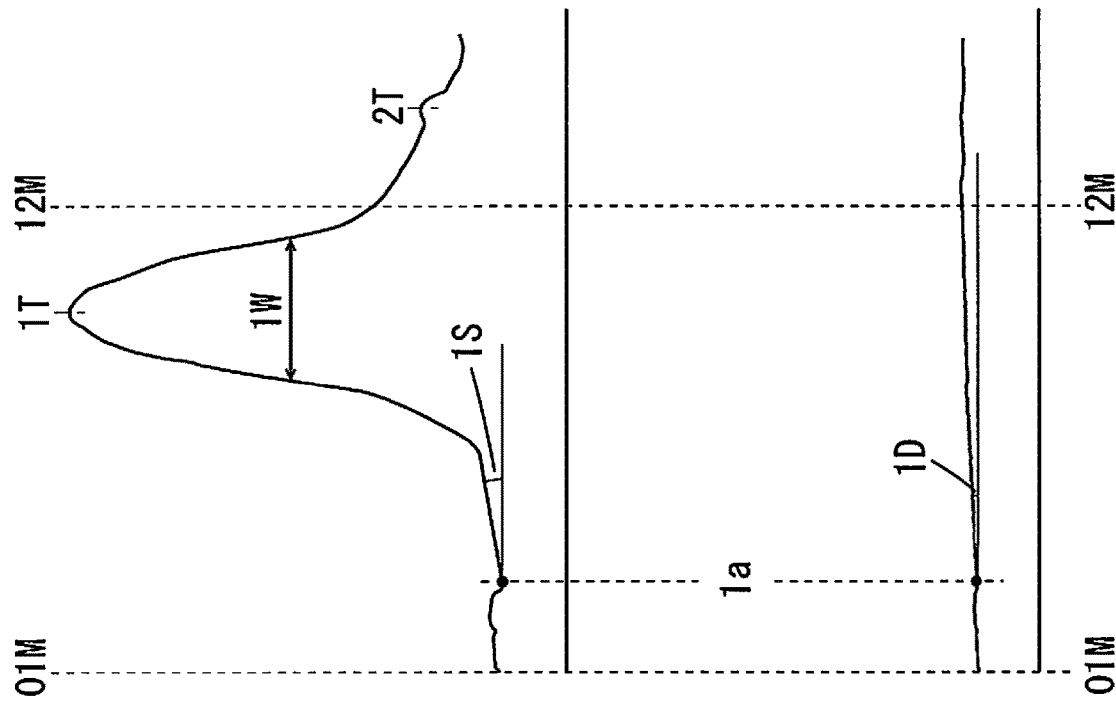
FIG. 8 is a schematic diagram for explaining the automatic creation operation of the time program by the waveform processing assistance device.

Then, a plurality of initial processing sections are determined. The waveform data b is shown in the upper part of FIG. 7, and a background chromatogram bk is shown in the lower part of FIG. 7. The waveform data b has the correct answer peaks No. 1 to No. 6. The correct answer peaks No. 1 to No. 6 have their peak tops 1T to 6T, respectively. Start points 1a to 6a of the correct answer peaks No. 1 to No. 6 are shown in FIG. 7.

The plurality of initial processing sections are determined to include the plurality of correct answer peaks No. 1 to No. 6. In this embodiment, a boundary between two adjacent initial processing sections is determined at an intermediate position between the peak tops of two adjacent correct answer peaks. A start position of the initial processing section that includes the correct answer peak No. 1 at the left end is determined at an arbitrary position 01M between the start point of the waveform data b and the start point 1a of the correct answer peak No. 1. A boundary 12M is determined at an intermediate position between the peak tops 1T and 2T. Similarly, boundaries 23M, 34M, 45M, 56M of the initial processing sections that respectively include the correct answer peaks No. 2 to No. 6 are determined. An end position of the initial processing section that includes the correct answer peak No. 6 at the right end is determined at an arbitrary position 60M between the end point of the waveform data b and the end point of the correct answer peak. In this way, the initial processing sections 01M to 12M, 12M to 23M, 23M to 34M, 34M to 45M, 45M to 56M, and 56M to 60M are determined.

Subsequently, initial values of waveform processing parameters for use in the waveform processing in each initial processing section are determined. The initial values of the waveform processing parameters for use in the waveform processing in each initial processing section are hereinafter referred to as parameter initial values. In this example, parameter initial values of "Slope," "Width," and "Drift" are determined as the parameter initial values. The initial processing section 01M to 12M of the waveform data b is shown in the upper part of FIG. 8, and the initial processing section 01M to 12M of the background chromatogram bk is shown in the lower part of FIG. 8.

The parameter initial values of the initial processing section 01M to 12M are determined as follows. A value of an inclination 1S of the start point 1a of the correct answer peak No. 1 is determined as the parameter initial value of "Slope." Also, a value of a half width 1W of the correct answer peak No. 1 is determined as the parameter initial value of "Width." In this case, the parameter initial value of "Width" may be determined using an analysis condition such as a gradient ratio as auxiliary data. Further, a value of an inclination 1D of the start point 1a of the background chromatogram bk is determined as the parameter initial value of "Drift." In this case, the background chromatogram bk is used as the auxiliary data for determining the parameter initial value. Alternatively, the parameter initial value of "Slope," "Width" or "Drift" may be determined using an analysis condition defined in an analysis method file as the auxiliary data. Similarly, the parameter initial values of the initial processing sections 12M to 23M, 23M to 34M, 34M to 45M, 45M to 56M, and 56M to 60M are determined.

Then, the waveform processing is performed on the plurality of waveform data a to j using the parameter initial values in each initial processing section. Thus, a plurality of waveform processing results corresponding to the plurality of waveform data a to j are obtained with respect to each initial processing section. The plurality of waveform processing results corresponding to each initial processing section of the plurality of waveform data a to j do not necessarily match corresponding correct answer data.

As such, the parameter initial values in each initial processing section are adjusted such that the plurality of waveform processing results corresponding to each initial processing section of the plurality of waveform data a to j match or approximate the corresponding correct answer data. A value of the waveform processing parameter generated by adjustment of each parameter initial value is hereinafter referred to as parameter adjustment value. Also, the parameter initial value and the parameter adjustment value are collectively referred to as parameter value.

Also, at least one initial processing section may be adjusted such that the plurality of waveform processing results corresponding to each initial processing section of the plurality of waveform data a to j match or approximate the corresponding correct answer data. Specifically, a length or a position (a position of the start point or the end point) of at least one initial processing section may be adjusted. A processing section generated by adjustment of each initial processing section is hereinafter referred to as adjustment processing section.

Figure 9:
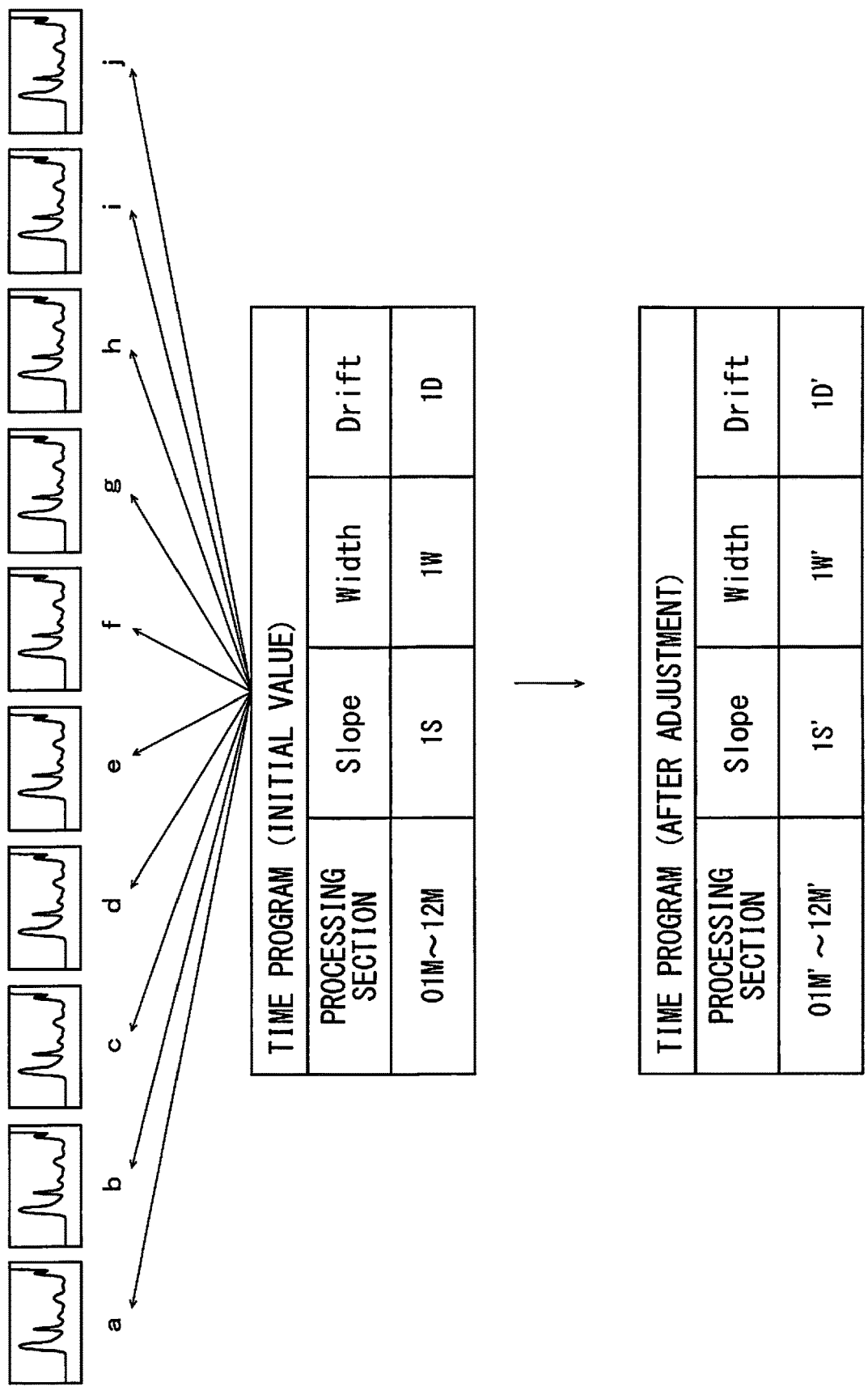
FIG. 9 is a schematic diagram for explaining the automatic creation operation of the time program by the waveform processing assistance device.

As shown in FIG. 9, the waveform processing is performed in the initial processing section 01M to 12M of the plurality of waveform data a to j using the parameter initial values. Subsequently, it is determined based on a degree of approximation whether the plurality of waveform processing results obtained by the waveform processing on the plurality of waveform data a to j match or approximate the correct answer data of the correct answer peak No. 1. An operation of determining whether the plurality of waveform processing results match or approximate the correct answer data is hereinafter referred to as determination operation.

The degree of approximation is represented by, for example, an absolute value of a difference between a value of each waveform processing result and a value of correct answer data. In a case where the waveform processing result is the area of a peak, the degree of approximation is represented by an absolute value of a difference between an area value of each waveform processing result and an area value of a correct answer peak.

In a case where the value of the degree of approximation with respect to one waveform processing result is 0, it is determined that the waveform processing result matches the correct answer data of the correct answer peak No. 1. In a case where the value of the degree of approximation with respect to one waveform processing result is not more than a predetermined threshold value, it is determined that the waveform processing result approximates the correct answer data of the correct answer peak No. 1. On the other hand, in a case where the value of the degree of approximation with respect to one waveform processing result is larger than the threshold value, it is determined that the waveform processing result does not approximate the correct answer data of the correct answer peak No. 1.

In a case where any of the waveform processing results with respect to the plurality of waveform data a to j does not approximate the correct answer data of the correct answer peak No. 1, the parameter initial values in the initial processing section 01M to 12M are adjusted. Thus, the parameter adjustment values in the initial processing section 01M to 12M are generated.

The waveform processing is performed in the initial processing section 01M to 12M of the waveform data a to j using the parameter adjustment value. Subsequently, it is determined based on the degree of approximation whether the plurality of waveform processing results obtained by the waveform processing on the waveform data a to j match or approximate the correct answer data of the correct answer peak No. 1. The degree of approximation is calculated on the basis of, for example, a degree to which a temporal overlap between each peak of the waveform data a to j and the correct answer peak No. 1, or a matching ratio of complete separation and vertical division between each peak of the waveform data a to j and the correct answer peak No. 1.

In a case where any of the plurality of waveform processing results with respect to the plurality of waveform data a to j does not match or approximate the correct answer data of the correct answer peak No. 1, the parameter adjustment values are further adjusted. The adjustment of the parameter values are repeated until the plurality of waveform processing results with respect to the plurality of waveform data a to j match or approximate the correct answer data of the correct answer peak No. 1. An upper limit value of the number of adjustments of the parameter values may be set in advance. Alternatively, the user may set the upper limit value of the number of adjustments of the parameter values using the operation unit 40.

Also, the initial processing section 01M to 12M may be adjusted such that the plurality of waveform processing results with respect to the plurality of waveform data a to j match or approximate the correct answer data of the correct answer peak No. 1. Thus, an adjustment processing section 01M' to 12M' is generated as shown in FIG. 9. An operation of adjusting the parameter values and an operation of adjusting the processing sections are hereinafter referred to as adjustment operation.

In the example of FIG. 9, before the adjustment, the value 1S of "Slope," the value 1W of "Width," and the value 1D of "Drift" are determined as the parameter initial values in the initial processing section 01M to 12M. After the adjustment, a value 1S' of "Slope," a value 1W' of "Width," and a value 1D' of "Drift" are determined as the parameter adjustment values in the initial processing section 01M' to 12M'. A series of operations that include the adjustment operation, the waveform processing, and the determination operation is hereinafter referred to as search operation.

The above-described search operation is sequentially performed on the other initial processing sections 12M to 23M, 23M to 34M, 34M to 45M, 45M to 56M, and 56M to 60M. The parameter values corresponding to a plurality of processing sections determined by the search operation are sequentially stored in the storage 30 of FIG. 1. Thus, a time program that includes an instruction to execute the waveform processing using the parameter values determined for each processing section is created.

In the example of FIG. 10, the time program includes adjustment processing sections 01M' to 12M', 12M' to 23M and the initial processing sections 23M to 34M, 34M to 45M, 45M to 56M, and 56M to 60M as the plurality of processing sections, and includes a value of adjusted "Slope," a value of adjusted "Width," and a value of adjusted "Drift" as the parameter values of each processing section. The parameter values of each processing section correspond to the instruction to execute the waveform processing using these parameter values.

(4) Functional Configuration of Waveform Processing Assistance Device 10

FIG. 11 is a block diagram showing a functional configuration of the waveform processing assistance device 10. The waveform processing assistance device 10 includes an acquirer 11, a selector 12, an extractor 13, a determiner 14, a waveform processor 15, an adjuster 16, a program creator 17, an executor 18, and a manual reviser 19 as function units. In this example, each of the constituent elements (11 to 19) of the waveform processing assistance device 10 is implemented by the CPU 110 of FIG. 1 executing a waveform processing assistance program stored in the ROM 130 or the storage 30. Some or all of the constituent elements (11 to 19) of the waveform processing assistance device 10 may be implemented by a hardware such as an electronic circuit.

The storage 30 stores a plurality of waveform data obtained by the analyzer 2 of FIG. 1. The plurality of waveform data include a plurality of waveform data obtained by an analysis of the same sample. Also, the storage 30 stores a background chromatogram.

The acquirer 11 acquires the plurality of waveform data obtained by the analysis of the same sample stored in the storage 30. The plurality of waveform data acquired by the acquirer 11 is displayed on the display 50. At least one of the plurality of waveform data acquired by the acquirer 11 may be waveform data that has a manually revised waveform processing result. The selector 12 selects one of the waveform data acquired by the acquirer 11 as reference data based on the operation of the operation unit 40 by the user. It is noted that the selector 12 may select the reference data in accordance with a predetermined condition.

The extractor 13 extracts a plurality of correct answer data corresponding to a plurality of correct answer peaks from the reference data. The determiner 14 determines a plurality of initial processing sections that respectively include the correct answer peaks, and a plurality of parameter initial values. In this case, the determiner 14 may determine the plurality of initial processing sections and the plurality of parameter initial values using an analysis condition of the analyzer 2 as auxiliary data. Here, the analysis condition includes, for example, an analysis method file, a gradient ratio or a background chromatogram. The waveform processor 15 performs waveform processing using parameter values in each processing section of the plurality of waveform data acquired by the acquirer 11.

The adjuster 16 adjusts the parameter values and the processing sections such that the waveform processing results obtained by the waveform processor 15 match or approximate the corresponding correct answer data. The user can set an upper limit value of the number of the adjustment operations of the adjuster 16 by the operation of the operation unit 40. The parameter values, the processing sections, and the degree of approximation obtained by the adjustment operation of the adjuster 16 are stored in the storage 30.

The program creator 17 creates a time program that includes the plurality of processing sections and the plurality of parameter values stored in the storage 30. The program creator 17 also causes the display 50 to display the created time program and causes the storage 30 to store the created time program.

The executor 18 executes the waveform processing on arbitrary waveform data generated by the analyzer 2 of FIG. 1 in accordance with the time program stored in the storage 30. Thus, the waveform processing can be easily performed on the arbitrary waveform data.

The manual reviser 19 revises waveform processing results obtained by the waveform processing by the executor 18 based on the operation of the operation unit 40 by the user. Also, the manual reviser 19 can provide the extractor 13 with the revised waveform processing results as new reference data. In this case, the revised waveform processing results are extracted as the correct answer data by the extractor 13. In this case, the adjuster 16 can further adjust parameter adjustment values using new correct answer data. Thus, the program creator 17 can create a time program in which waveform processing results desired by the user can be obtained.

(5) Operation of Waveform Processing Assistance Device 10

Figure 12:
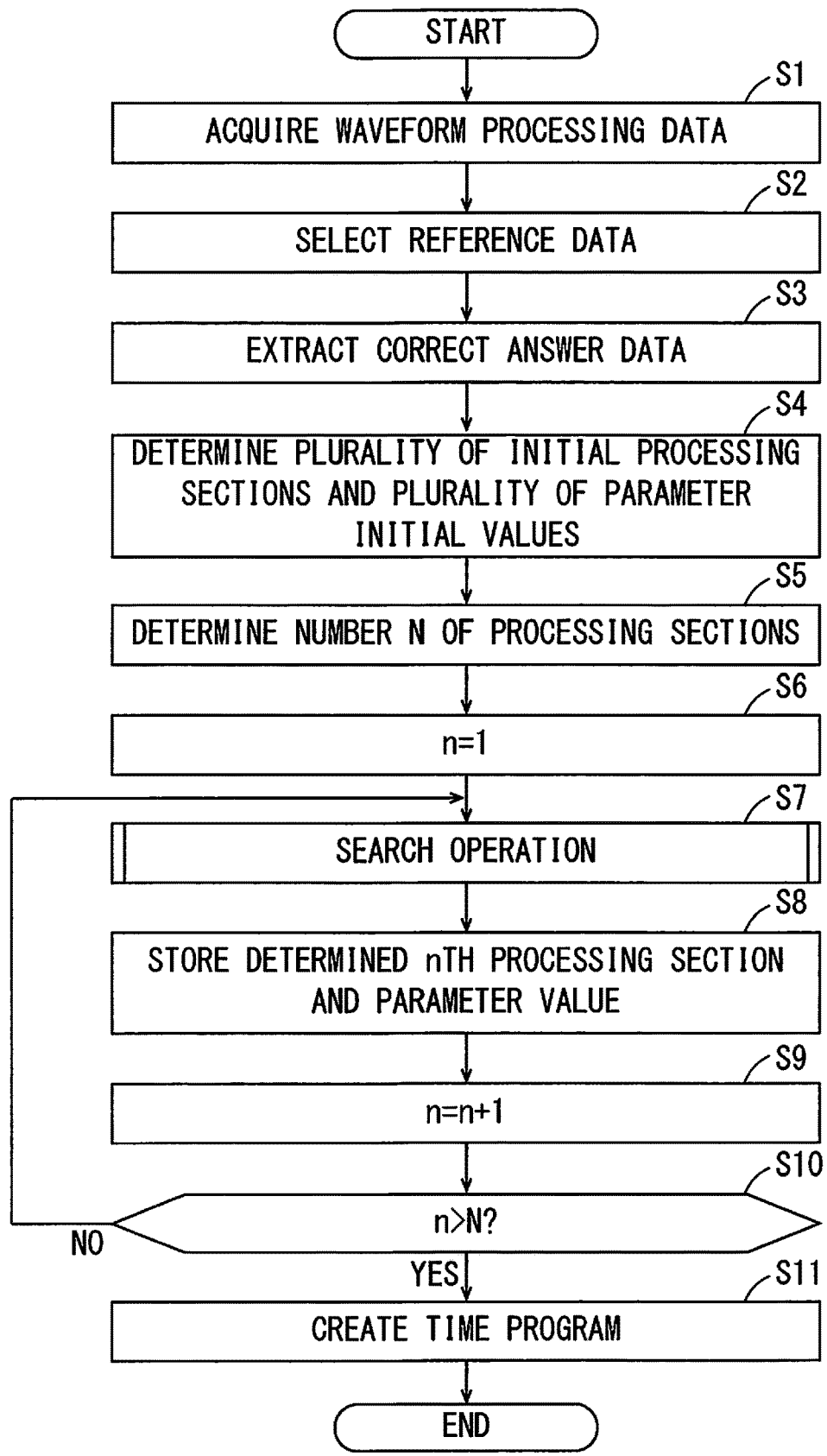
FIG. 12 is a flowchart showing an operation of the waveform processing assistance device of FIG. 11.
Figure 13:
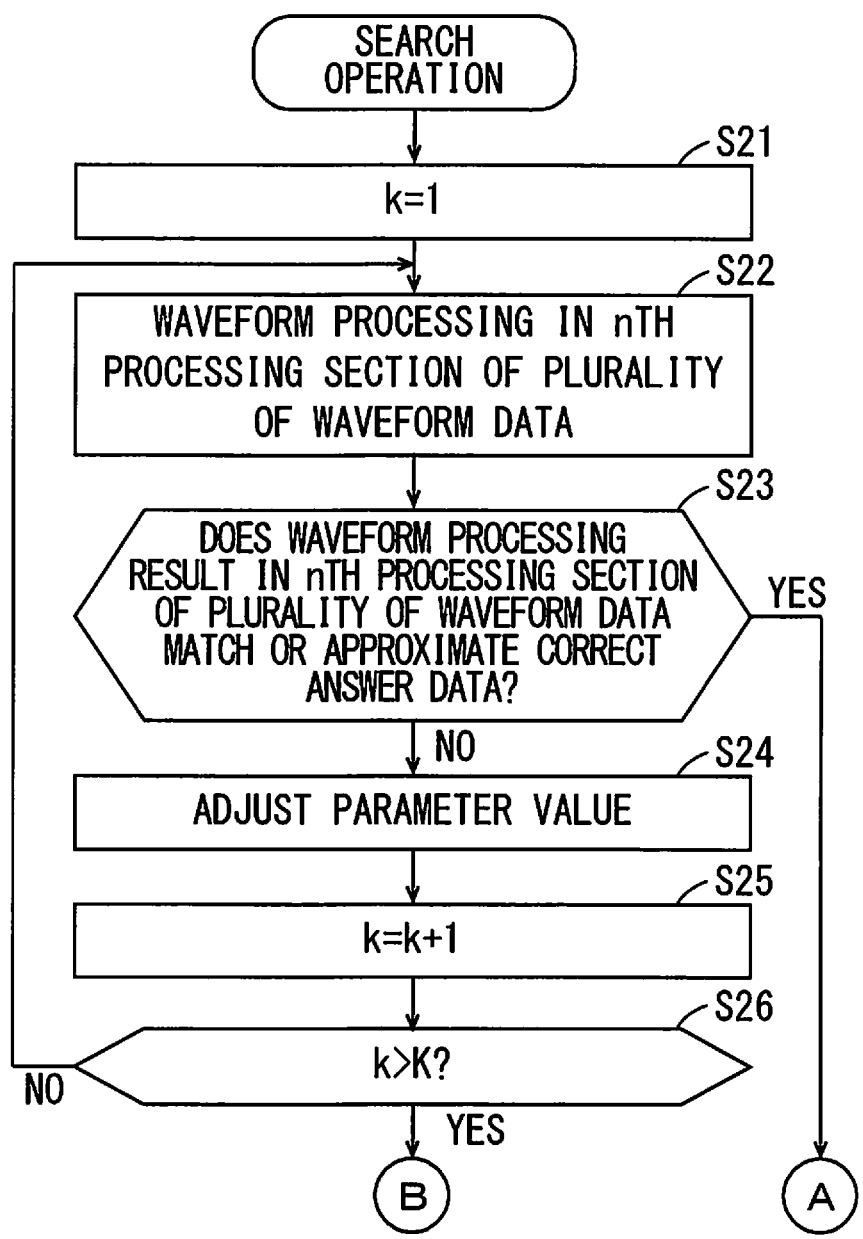
FIG. 13 is a flowchart showing the operation of the waveform processing assistance device of FIG. 11.
Figure 14:
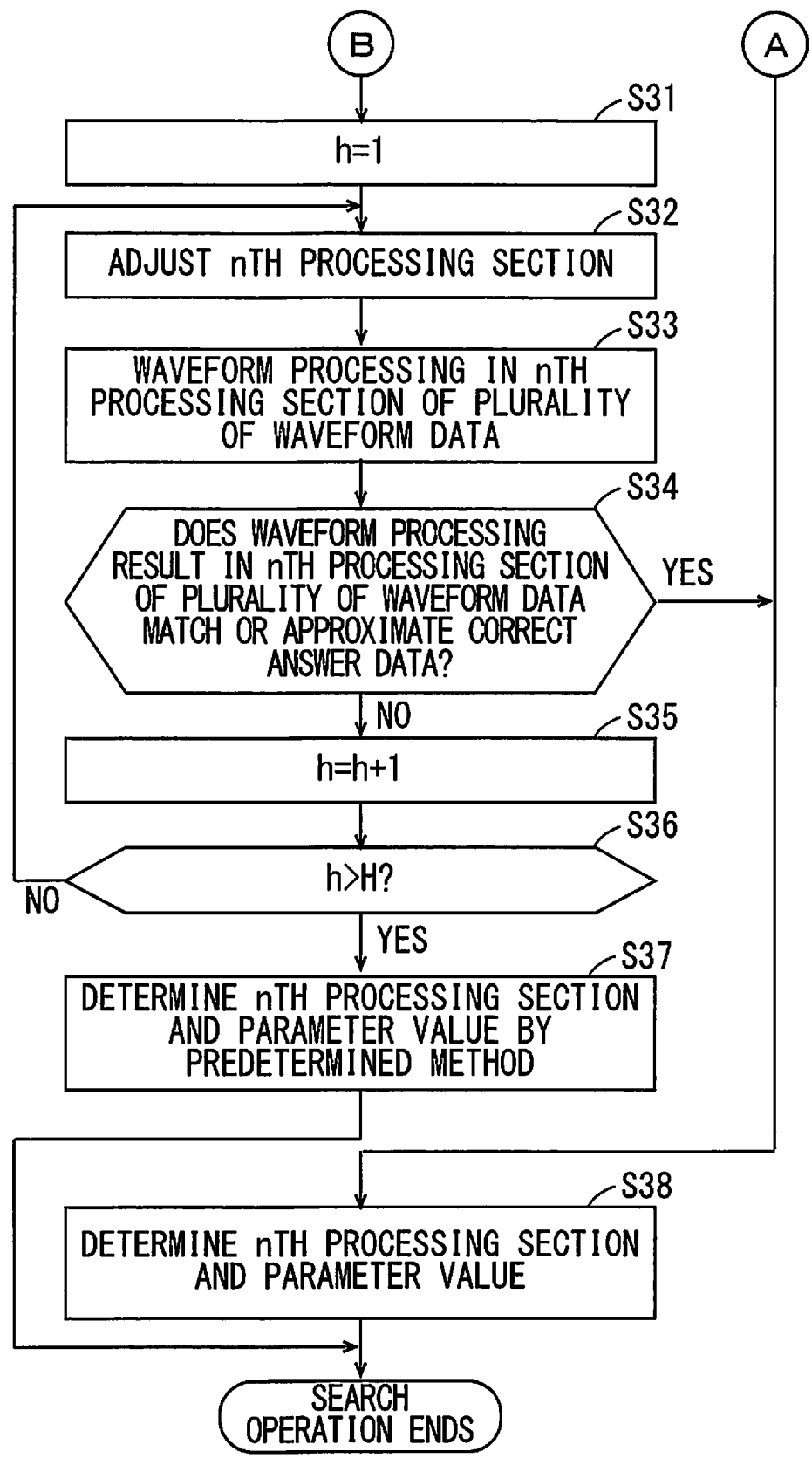
FIG. 14 is a flowchart showing the operation of the waveform processing assistance device of FIG. 11.

FIGS. 12 to 14 are flowcharts showing an operation of the waveform processing assistance device 10 of FIG. 11. First, the time program automatic creation operation by the waveform processing assistance device 10 will be described with reference to FIG. 12.

First, the acquirer 11 acquires a plurality of waveform data obtained by the analysis of the same sample (step S1). The selector 12 selects one of the acquired plurality of waveform data as reference data based on the operation of the operation unit 40 by the user (step S2). The selector may select the reference data in accordance with a predetermined condition. The extractor 13 extracts a plurality of correct answer data (waveform processing results) corresponding to a plurality of correct answer peaks from the reference data (step S3).

Then, the determiner 14 determines a plurality of initial processing sections that respectively include the correct answer peaks, and a plurality of parameter initial values (step S4). Also, the determiner 14 determines the number N of the plurality of initial processing sections (step S5).

The adjuster 16 sets a value of a variable n to 1 (step S6). The waveform processor 15 and the adjuster 16 perform a search operation which will be described below (step S7). The adjuster 16 causes the storage 30 to store an nth processing section and an nth parameter value determined by the search operation (step S8). Subsequently, the adjuster 16 adds 1 to the variable n (step S9).

The adjuster 16 determines whether the value of the variable n is larger than N (step S10). In a case where the value of the variable n is not larger than N, the adjuster 16 returns to step S7. Thus, the processing in steps S7 to S10 is performed on the next processing section. The processing in steps S7 to S10 is repeated until the value of the variable n becomes larger than N. As a result, the 1st to Nth processing sections and parameter values are stored in the storage 30.

In a case where the value of the variable n is not larger than N, the program creator 17 creates a time program that includes the 1st to Nth processing sections and parameter values stored in the storage 30 (step S11).

Then, the search operation of FIG. 12 will be described with reference to FIGS. 13 and 14. First, the adjuster 16 sets a value of a variable k to 1 (step S21). The waveform processor 15 performs waveform processing using the nth parameter value in the nth processing section of the plurality of waveform data (step S22). Thus, a plurality of waveform processing results in the nth processing section of the plurality of waveform data are obtained.

The adjuster 16 determines whether the plurality of waveform processing results in the nth processing section of the plurality of waveform data match or approximate the correct answer data (step S23). In a case where any of the plurality of waveform processing results does not match or approximate the correct answer data, the adjuster 16 adjusts the nth parameter value (step S24). The adjusted parameter value (parameter adjustment value) and the degree of approximation of the plurality of waveform data are stored in the storage 30.

Subsequently, the adjuster 16 adds 1 to the value of the variable k (step S25). The adjuster 16 determines whether the value of the variable k is larger than an upper limit value K of the number of adjustments set in advance (step S26). Here, the upper limit value K of the number of adjustments may be set based on the operation of the operation unit 40 by the user, and a predetermined value may be used as the upper limit value K.

In a case where the value of the variable k is not larger than the upper limit value K of the number of adjustments set in advance, the adjuster 16 returns to step S22. Thus, the processing in steps S22 to S26 is carried out.

The processing in steps S22 to S26 is repeated until the plurality of waveform processing results in the nth processing section of the plurality of waveform data match or approximate the correct answer data, or the value of the variable k becomes larger than K in step S23.

In a case where the plurality of waveform processing results in the nth processing section of the plurality of waveform data match or approximate the correct answer data in step S23, the adjuster 16 determines the nth initial processing section and the parameter value (the parameter initial value or the parameter adjustment value) at that point of time as an nth processing section and a parameter value in the nth processing section (step S38 of FIG. 14).

In a case where the value of the variable k is larger than K in step S26, the adjuster 16 sets a value of a variable h to 1 (step S31 of FIG. 14). The adjuster 16 adjusts the nth processing section (step S32). In this case, at least one of a position and a length of the nth processing section is adjusted. For example, a position of an end point of the nth processing section is adjusted.

The waveform processor 15 performs waveform processing using the nth parameter value in the adjusted nth processing section (adjustment processing section) of the plurality of waveform data (step S33). In this case, as a parameter value, a parameter value of the K parameter values stored in the storage 30, which is used in a case where the degree of approximation corresponding to the plurality of waveform data is comprehensively closer to 0, is used. Thus, a plurality of waveform processing results in the adjusted nth processing section of the plurality of waveform data are obtained.

The adjuster 16 determines whether the plurality of waveform processing results in the adjusted nth processing section of the plurality of waveform data match or approximate the correct answer data (step S34). The adjusted processing section (adjustment processing section) and the degree of approximation of the plurality of waveform data are stored in the storage 30.

Subsequently, the adjuster 16 adds 1 to the value of the variable h (step S35). The adjuster 16 determines whether the value of the variable h is larger than an upper limit value H of the number of adjustments set in advance (step S36). Here, the upper limit value H of the number of adjustments may be set based on the operation of the operation unit 40 by the user, and a predetermined value may be used as the upper limit value K.

In a case where the value of the variable h is not larger than the upper limit value H of the number of adjustments set in advance, the adjuster 16 returns to step S32. Thus, the processing in steps S32 to S36 is performed.

The processing in steps S32 to S36 is repeated until the plurality of waveform processing results in the nth processing section of the plurality of waveform data match or approximate the correct answer data, or the value of the variable h becomes larger than H in step S34.

In a case where the plurality of waveform processing results in the adjusted nth processing section of the plurality of waveform data match or approximate the correct answer data in step S34, the adjuster 16 determines the adjusted processing section and parameter value as the nth processing section and the parameter value in the nth processing section (step S38). Then, the adjuster 16 proceeds to step S8 of FIG. 12.

In a case where the value of the variable k is larger than K in step S35, the adjuster 16 determines the nth processing section and the parameter value in the nth processing section by a predetermined method (step S37). For example, the adjuster 16 determines a processing section of the H processing sections stored in the storage 30, which is used in a case where the degree of approximation corresponding to the plurality of waveform data is comprehensively closer to 0, and a parameter value in that processing section as the nth processing section and the parameter value in the nth processing section. Then the adjuster 16 proceeds to step S8 of FIG. 12.

The time program created in step S11 may be stored in the storage 30. Also, the executor 18 may perform the waveform processing on another arbitrary waveform data generated by the analyzer 2 of FIG. 1 using the time program stored in the storage 30. Thus, appropriate waveform processing results are obtained. Also, the manual reviser 19 may revise the waveform processing results obtained by the waveform processing by the executor 18 by the user's operation. The waveform processing results revised by the manual reviser 19 may be provided to the extractor 13 as the correct answer data.

(6) Effects of Embodiments

With the waveform processing assistance device according to this embodiment, the versatile time program is automatically created by the search operation using the plurality of waveform data and the reference data. With the time program created in this way, the waveform processing is performed using the appropriate parameter adjustment values with high robustness with respect to the time and intensity of a peak in each processing section of the waveform data. Thus, the user can appropriately and easily carry out the waveform processing on the one or the plurality of waveform data obtained by the analysis of the same sample.

Also, since the parameter adjustment value is obtained in each processing section and at least one processing section is adjusted by the adjuster 16, the time program in which the waveform processing can be more appropriately performed is created.

Furthermore, in a case where the plurality of waveform data acquired by the acquirer 11 include the waveform data that has manually revised waveform processing results, the time program in which more appropriate waveform processing results can be obtained is created.

Also, since the adjustment of the parameter value is repeated, a more appropriate parameter adjustment value is obtained in each processing section. Moreover, since the upper limit value K of the number of adjustments of the parameter values or the upper limit value H of the number of adjustments of the processing sections can be set, a time required for the waveform processing can be limited. Thus, it is possible to create the time program in which more appropriate waveform processing results can be obtained, in an appropriate period of time.

Furthermore, since the analysis condition such as the background chromatogram can be used as the auxiliary data when the parameter initial values are determined, it is possible to create the time program in which more appropriate waveform processing results can be obtained.

(7) Other Embodiments

While the automatic creation operation of the time program for performing the waveform processing on the chromatogram as the waveform data is described in the above-described embodiment, the waveform processing assistance device 10 can also perform the automatic creation operation of a waveform processing execution program for performing the waveform processing on a mass spectrum as the waveform data.

While the search operation is performed using the one reference data in the above-described embodiment, the search operation may be performed using a plurality of reference data.

While the plurality of processing sections are determined in common with respect to the one or the plurality of types of waveform processing parameters in the above-described embodiment, the plurality of processing sections may be determined individually with respect to the plurality of types of waveform processing parameters. In this case, the search operation is performed independently with respect to each type of waveform processing parameters.

While the plurality of waveform data acquired by the acquirer 11 and the time program created by the program creator 17 are displayed on the display 50 in the above-described embodiment, various information such as the plurality of waveform data and the time program may be displayed on the display 2A of the analyzer 2.

(8) Aspects

The above-mentioned plurality of exemplary embodiments are understood as specific examples of the below-mentioned aspects by those skilled in the art.

(Item 1) A waveform processing assistance device that assists waveform processing of separating peaks of waveform data indicating an analysis result of an analyzer based on a value of a waveform processing parameter according to one aspect may include:

an acquirer that acquires a plurality of waveform data obtained by an analysis of a sample;

a selector that selects at least one of the acquired plurality of waveform data as reference data;

an extractor that extracts a plurality of peaks separated from the reference data as a plurality of correct answer peaks and also extracts a waveform processing result with respect to each of the plurality of correct answer peaks as correct answer data;

a determiner that determines a plurality of processing sections that respectively include the plurality of correct answer peaks, and also determines a value of a waveform processing parameter for obtaining the plurality of correct answer data as a parameter initial value;

a waveform processor that performs waveform processing on the acquired plurality of waveform data in each of the determined plurality of processing sections based on the parameter initial value;

an adjuster that adjusts the parameter initial value corresponding to each of the plurality of processing sections such that the waveform processing result obtained in each processing section matches or approximates corresponding correct answer data of the plurality of correct answer data, to generate a parameter adjustment value; and a program creator that creates a waveform processing execution program that includes an instruction to execute waveform processing using the corresponding parameter adjustment value in each of the plurality of processing sections.

With the waveform processing assistance device according to the one aspect, the plurality of waveform data obtained by the analysis of the sample are acquired, and the at least one of the acquired plurality of waveform data is selected as the reference data. The plurality of peaks separated from the reference data are extracted as the plurality of correct answer peaks. Also, the waveform processing result with respect to each of the plurality of correct answer peaks is extracted as the correct answer data. The plurality of processing sections that respectively include the plurality of correct answer peaks are determined, and also the value of the waveform processing parameter for obtaining the plurality of correct answer data is determined as the parameter initial value. The waveform processing is performed on the plurality of waveform data in each of the plurality of processing sections based on the parameter initial value. The parameter initial value is adjusted with respect to each processing section such that the waveform processing result obtained in each processing section matches or approximates the corresponding correct answer data. Thus, the parameter adjustment value is generated. A versatile waveform processing execution program that includes the instruction to execute the waveform processing using the corresponding adjustment value in each processing section is automatically created.

With the waveform processing execution program created in this way, the waveform processing using an appropriate parameter adjustment value is executed in each processing section of the waveform data. Thus, the user can appropriately and easily carry out the waveform processing with respect to the one or the plurality of waveform data.

(Item 2) In the waveform processing assistance device according to item 1, the adjuster may adjust at least one processing section such that the waveform processing result obtained in each processing section matches or approximates the corresponding correct answer data of the plurality of correct answer data, and the program creator may create the waveform processing execution program to include the instruction to execute the waveform processing using the parameter adjustment value in the adjusted processing section.

With the waveform processing assistance device according to item 2, since the parameter adjustment value is obtained in each processing section, and the at least one processing section is adjusted, the waveform processing execution program in which the waveform processing can be more appropriately performed is created.

(Item 3) In the waveform processing assistance device according to item 1 or 2, the adjuster may be configured to be capable of acquiring waveform data having a manually revised waveform processing result as at least one of the plurality of waveform data.

With the waveform processing assistance device according to item 3, since the plurality of waveform data include the waveform data having the manually revised waveform processing result, the waveform processing execution program in which a more appropriate waveform processing result can be obtained is created.

(Item 4) In the waveform processing assistance device according to any one of items 1 to 3, the adjuster may be configured to be capable of setting an upper limit value of a number of adjustments of the parameter initial value and the parameter adjustment value.

With the waveform processing assistance device according to item 4, since the adjustment of the parameter initial value and the parameter adjustment value is repeated, a more appropriate parameter adjustment value is obtained in each processing section. Also, since the upper limit value of the number of adjustments of the parameter initial value and the parameter adjustment value can be set, a time required for the waveform processing can be limited. Thus, it is possible to create the waveform processing execution program in which an appropriate waveform processing result can be obtained, in an appropriate period of time.

(Item 5) The waveform processing assistance device according to any one of items 1 to 4 may further include an executor that executes the waveform processing on another waveform data different from the plurality of waveform data in accordance with the waveform processing execution program.

With the waveform processing assistance device according to item 5, the waveform processing can be easily performed on arbitrary waveform data using the created waveform processing execution program.

(Item 6) The waveform processing assistance device according to item 5 may further include a manual reviser configured to be capable of manually adjusting the waveform processing result obtained by the waveform processing by the executor, and the adjuster may further adjust the parameter adjustment value using the waveform processing result revised by the manual reviser as new correct answer data.

With the waveform processing assistance device according to item 6, since the parameter adjustment value is further adjusted using the waveform processing result revised by the user as the correct answer data, the waveform processing execution program in which the waveform processing result desired by the user can be obtained is created.

(Item 7) In the waveform processing assistance device according to any one of items 1 to 6, the determiner may determine the parameter initial value using auxiliary data related to an analysis condition of the analyzer.

With the waveform processing assistance device according to item 7, since the parameter initial value is determined in view of the analysis condition, it is possible to create the waveform processing execution program in which a more appropriate waveform processing result can be obtained.

(Item 8) In the waveform processing assistance device according to any one of items 1 to 7, the acquirer may acquire the plurality of waveform data obtained by the analysis of a same sample.

With the waveform processing assistance device according to item 8, since the acquirer acquires the plurality of waveform data obtained by the analysis of the same sample, the waveform processing execution program in which the more appropriate waveform processing result can be obtained is created.

(Item 9) A waveform processing assistance method of assisting waveform processing of separating peaks of waveform data indicating an analysis result of an analyzer based on a value of a waveform processing parameter according to another aspect may include:

acquiring a plurality of waveform data obtained by an analysis of a sample;

selecting at least one of the acquired plurality of waveform data as reference data;

extracting a plurality of peaks separated from the reference data as a plurality of correct answer peaks and also extracting a waveform processing result with respect to each of the plurality of correct answer peaks as correct answer data;

determining a plurality of processing sections that respectively include the plurality of correct answer peaks, and also determining a value of a waveform processing parameter for obtaining the plurality of correct answer data as a parameter initial value;

performing waveform processing on the acquired plurality of waveform data in each of the determined plurality of processing sections based on the parameter initial value;

adjusting the parameter initial value corresponding to each of the plurality of processing sections such that the waveform processing result obtained in each processing section matches or approximates corresponding correct answer data of the plurality of correct answer data, to generate a parameter adjustment value; and creating a waveform processing execution program that includes an instruction to execute waveform processing using the corresponding parameter adjustment value in each of the plurality of processing sections.

With the waveform processing assistance method according to another aspect, the plurality of waveform data obtained by the analysis of the sample are acquired, and the at least one of the acquired plurality of waveform data is selected as the reference data. The plurality of peaks separated from the reference data are extracted as the plurality of correct answer peaks. Also, the waveform processing result with respect to each of the plurality of correct answer peaks is extracted as the correct answer data. The plurality of processing sections that respectively include the plurality of correct answer peaks are determined, and also the value of the waveform processing parameter for obtaining the plurality of correct answer data is determined as the parameter initial value. The waveform processing is performed on the plurality of waveform data in each of the plurality of processing sections based on the parameter initial value. The parameter initial value is adjusted with respect to each processing section such that the waveform processing result obtained in each processing section matches or approximates the corresponding correct answer data. Thus, the parameter adjustment value is generated. A versatile waveform processing execution program that includes the instruction to execute the waveform processing using the corresponding adjustment value in each processing section is automatically created.

With the waveform processing execution program created in this way, the waveform processing using the appropriate parameter adjustment value is executed in each processing section of the waveform data. Thus, the user can appropriately and easily carry out the waveform processing with respect to the one or the plurality of waveform data.

While preferred embodiments of the present disclosure have been described above, it is to be understood that variations and modifications will be apparent to those skilled in the art without departing the scope and spirit of the present disclosure. The scope of the present disclosure, therefore, is to be determined solely by the following claims.

We claim:

1. A waveform processing assistance device that separates peaks of waveform data indicating an analysis result of an analyzer, comprising:

a controller including a computer processor, the computer processor:

acquires a plurality of waveform data obtained by an analysis of a sample;

selects at least one of the acquired plurality of waveform data as reference data;

performs first waveform processing on the reference data to extract a waveform processing result of the first waveform processing as correct answer data with respect to each of a plurality of correct answer peaks indicating a plurality of peaks separated from the reference data;

determines a plurality of processing sections that includes at least one of the plurality of correct answer peaks;

determines an initial value of a parameter for separating peaks used in second waveform processing different from the first waveform processing in the plurality of processing sections;

performs the second waveform processing on the acquired plurality of waveform data in each of the determined plurality of processing sections based on the parameter;

adjusts the parameter corresponding to each of the plurality of processing sections such that a waveform processing result of the second waveform processing obtained in each processing section matches or approximates corresponding correct answer data of the plurality of correct answer data, to generate a parameter adjustment value; and creates a waveform processing execution program that includes an instruction to execute the second waveform processing using the corresponding parameter adjustment value in each of the plurality of processing sections on another waveform data different from the plurality of waveform data.

2. The waveform processing assistance device according to claim 1, wherein the computer processor adjusts at least one processing section such that the waveform processing result obtained by the second waveform processing in each of the plurality of processing sections matches or approximates the corresponding correct answer data of the plurality of correct answer data, and creates the waveform processing execution program to include the instruction to execute the second waveform processing using the parameter adjustment value in the adjusted processing section.

3. The waveform processing assistance device according to claim 1, wherein the first waveform processing includes manually obtaining the waveform processing result with respect to the reference data.

4. The waveform processing assistance device according to claim 1, wherein the computer processor is capable of setting an upper limit value of a number of adjustments of the parameter.

5. The waveform processing assistance device according to claim 1, wherein the computer processor executes the second waveform processing on the other waveform data in accordance with the waveform processing execution program.

6. The waveform processing assistance device according to claim 5, wherein the waveform processing result obtained by the first waveform processing is manually adjustable, and the computer processor further adjusts the parameter using the manually adjusted waveform processing result as new correct answer data.

7. The waveform processing assistance device according to claim 1, wherein the computer processor determines the initial value of the parameter using auxiliary data related to an analysis condition of the analyzer.

8. The waveform processing assistance device according to claim 1, wherein the plurality of waveform data are a plurality of waveform data obtained by the analysis of a same sample.

9. A waveform processing assistance method of separating peaks of waveform data indicating an analysis result of an analyzer, comprising:

acquiring a plurality of waveform data obtained by an analysis of a sample;

selecting at least one of the acquired plurality of waveform data as reference data;

extracting using the computer processor a plurality of correct answer peaks from the reference data the plurality of peaks included in the reference data;

performing first waveform processing on the reference data to extracting a waveform processing result of the first waveform processing as correct answer data with respect to each of a plurality of correct answer peaks indicating a plurality of peaks separated from the reference data;

determining a plurality of processing sections that includes at least one of the plurality of correct answer peaks;

determining an initial value of a parameter for separating peaks used in second waveform processing different from the first waveform processing in the plurality of processing sections;

performing the second waveform processing on the acquired plurality of waveform data in each of the determined plurality of processing sections based on the parameter;

adjusting the parameter corresponding to each of the processing sections such that a waveform processing result of the second waveform processing obtained in each of the processing sections matches or approximates corresponding correct answer data of the plurality of correct answer data, to generate a parameter adjustment value; and creating a waveform processing execution program that includes an instruction to execute the second waveform processing using the corresponding parameter adjustment value in each of the plurality of processing sections with respect to another waveform data different from the plurality of waveform data.

* * * * *